United States Patent
Furukawa et al.

(10) Patent No.: US 7,440,377 B2
(45) Date of Patent: Oct. 21, 2008

(54) METHOD FOR ADJUSTING FOCUS BIAS IN OPTICAL DISC DRIVE AND OPTICAL DISC DRIVE THAT CAN IMPLEMENT THE METHOD

(75) Inventors: Kenichi Furukawa, Kanagawa (JP); Yuichi Maekawa, Kanagawa (JP)

(73) Assignee: Mitsumi Electric Co., Ltd. (JP)

( * ) Notice: Subject to any disclaimer, the term of this patent is extended or adjusted under 35 U.S.C. 154(b) by 392 days.

(21) Appl. No.: 10/815,175

(22) Filed: Mar. 26, 2004

(65) Prior Publication Data

US 2004/0218486 A1    Nov. 4, 2004

(30) Foreign Application Priority Data

Mar. 28, 2003    (JP)    ............... 2003-092937

(51) Int. Cl.
    G11B 20/18    (2006.01)
(52) U.S. Cl. ................ 369/53.28; 369/53.23
(58) Field of Classification Search .......... 369/44.27, 369/53.23, 53.28
    See application file for complete search history.

(56) References Cited

U.S. PATENT DOCUMENTS

| | | | |
|---|---|---|---|
| 5,627,807 A | * | 5/1997 | Abe .................. 369/44.29 |
| 5,751,674 A | * | 5/1998 | Bradshaw et al. ......... 369/44.35 |
| 6,049,513 A | | 4/2000 | Park |
| 7,061,594 B2 | * | 6/2006 | Worthington et al. ......... 356/72 |
| 2004/0165493 A1 | * | 8/2004 | Fukui ..................... 369/44.32 |
| 2006/0083140 A1 | * | 4/2006 | Itou ....................... 369/53.19 |

FOREIGN PATENT DOCUMENTS

| | | |
|---|---|---|
| JP | 8083431 B1 | 3/1996 |
| JP | 8203091 B1 | 8/1996 |
| JP | 2002-312959 B1 | 10/2002 |
| WO | WO 98/54706 | 12/1998 |

\* cited by examiner

*Primary Examiner*—Joseph Feild
*Assistant Examiner*—Parul Gupta
(74) *Attorney, Agent, or Firm*—Marger Johnson & McCollom, P.C.

(57) ABSTRACT

A method for adjusting a focus bias in an optical disc drive comprises the steps of: rotationally driving an optical disc in a state that only focus servo is engaged without engaging tracking servo; driving an actuator of an optical pick-up so that a laser beam projected from the optical pick-up is moved in a tracking direction to obtain an HF signal; and determining a focus bias by which a proper focusing point can be obtained based on the HF signal. The driving of the actuator is carried out by supplying an actuator drive control signal to a tracking actuator of the optical pick-up in a state that tracking servo is not engaged.

8 Claims, 1 Drawing Sheet

METHOD FOR ADJUSTING FOCUS BIAS IN OPTICAL DISC DRIVE AND OPTICAL DISC DRIVE THAT CAN IMPLEMENT THE METHOD

CROSS REFERENCE TO RELATED APPLICATIONS

This application claims priority of Japanese Patent Application No. 2003-092937, filed on Mar. 28, 2003, the contents of which are herein incorporated by reference in their entirety.

BACKGROUND OF THE INVENTION

1. Field of the Invention

This invention relates to a method for adjusting a focus bias in an optical disc drive, and in particular relates to a method for adjusting a focus bias in an optical disc drive for setting an optimum focusing point.

2. Description of the Prior Art

In optical disc drives which reproduce data from or record and reproduce data to and from optical discs such as CD (compact disc), CD-ROM, CD-R, and CD-RW and the like, an optical beam projected from an optical pick-up is adapted to follow spiral tracks formed in an optical disc by tracking servo, and a distance between a recording surface of the optical disc and an objective lens is kept constant by focus servo, whereby data can be accurately reproduced from or recorded to the optical disc. These servo operations are carried out based on error signals such as a tracking error signal or a focus error signal. These error signals are produced based on distributions of a reflected beam of a laser beam which has been projected to the optical disc. Specifically, the tracking servo signal and the focus servo signal are produced by adding appropriate gain to the error signals and then performing phase compensation thereto. By using the thus produced servo signals, a tracking actuator (that is, a tracking coil) and a focusing actuator (that is, a focusing coil) provided in the optical pick-up are driven through an actuator driver.

In these optical disc drives, it is necessary to make focusing of a laser beam accurately so that a laser beam projected from the optical pick-up can obtain an optimal focusing point at the recording surface of the optical disc. For this purpose, a focusing point adjustment in a focusing direction is carried out, when an optical disc drive is manufactured or shipped (hereinafter, this adjustment is referred to as "focus bias adjustment").

Conventionally, as shown in publication of Japanese translated version of International Application No. 2002-502534 (pages 5 to 7), such a focus bias adjustment is carried out by reproducing an optical disc under the condition that tracking servo and focus servo are engaged. Then, by using amplitudes of an HF signal obtained under that condition, a focus bias for the focus servo signal is determined so that an amplitude of the HF signal becomes largest, and then such a focus bias is set as the optimum focus bias value, whereby the focus bias adjustment is carried out.

However, in the focus bias adjustment method as described above, there is a case that tracking servo is dislocated during the focus bias adjustment, so that a proper adjustment can not be carried out. Namely, in the method described above, an optimum focusing point is determined by varying the bias for the focus serve within a predetermined adjustment range under the condition that tracking servo is being engaged. However, there is a case that a trouble in which tracking servo is dislocated occurs due to enlargement of a spot diameter of a laser beam during the process of varying the bias for the focus servo. Such a trouble is likely to occur when a focus bias value at the time when the adjustment is carried out is far away from a focus bias value for an optimum focusing point.

Further, such a trouble is also likely to occur when an offset component in an error signal extracting circuit is large.

SUMMARY OF THE INVENTION

The present invention has been made in view of the problems in the prior art described above, and therefore, it is an object of the present invention to provide a method for adjusting focus bias that can determine an optimum focus bias without engaging tracking servo.

In order to achieve the object, the present invention is directed to a method for adjusting focus bias in an optical disc drive. The method comprises the steps of: rotationally driving an optical disc in a state that only focus servo is engaged without engaging tracking servo; driving an actuator of an optical pick-up so that a laser beam projected from the optical pick-up is moved in a tracking direction to obtain an HF signal; and determining a focus bias by which a proper focusing point can be obtained based on the HF signal.

According to the focus bias adjustment method described above, since an actuator of an optical pick-up is driven so that a laser beam projected from the optical pick-up is moved or displaced in a tracking direction under the condition that tracking servo is not engaged, a pseudo state resembling a state in which tracking servo is being actually engaged is intentionally created to obtain an HF signal. By using thus obtained HF signal, an optimum focus bias is determined. Therefore, it is possible to carry out a focus bias adjustment without experiencing a trouble in that tracking servo is dislocated during the adjustment due to enlargement of a spot diameter of a laser beam which was likely to occur in the adjustment process in the conventional method.

Preferably, the driving of the actuator is carried out by supplying an actuator drive control signal to a tracking actuator of the optical pick-up in a state that tracking servo is not engaged. In this case, it is preferred the actuator driven control signal includes a signal which applies a drive voltage in the form of a pulse wave or a sinusoidal wave to the tracking actuator.

Further, it is also preferred that the focus bias value is determined based on a signal obtained by passing the HF signal into a peak/bottom holding circuit.

Furthermore, it is also preferred that the focus bias adjustment is carried out every time upon an optical disc is loaded into the disc drive.

Another aspect of the present invention is directed to an optical disc drive equipped with a circuit by which the method described above can be implemented.

The above described and other objects, structures and advantages of the present invention will be more apparent when the following description of the preferred embodiment is considered taken in conjunction with the appended drawing.

DETAILED DESCRIPTION OF THE PREFERRED EMBODIMENTS

Figure 1:
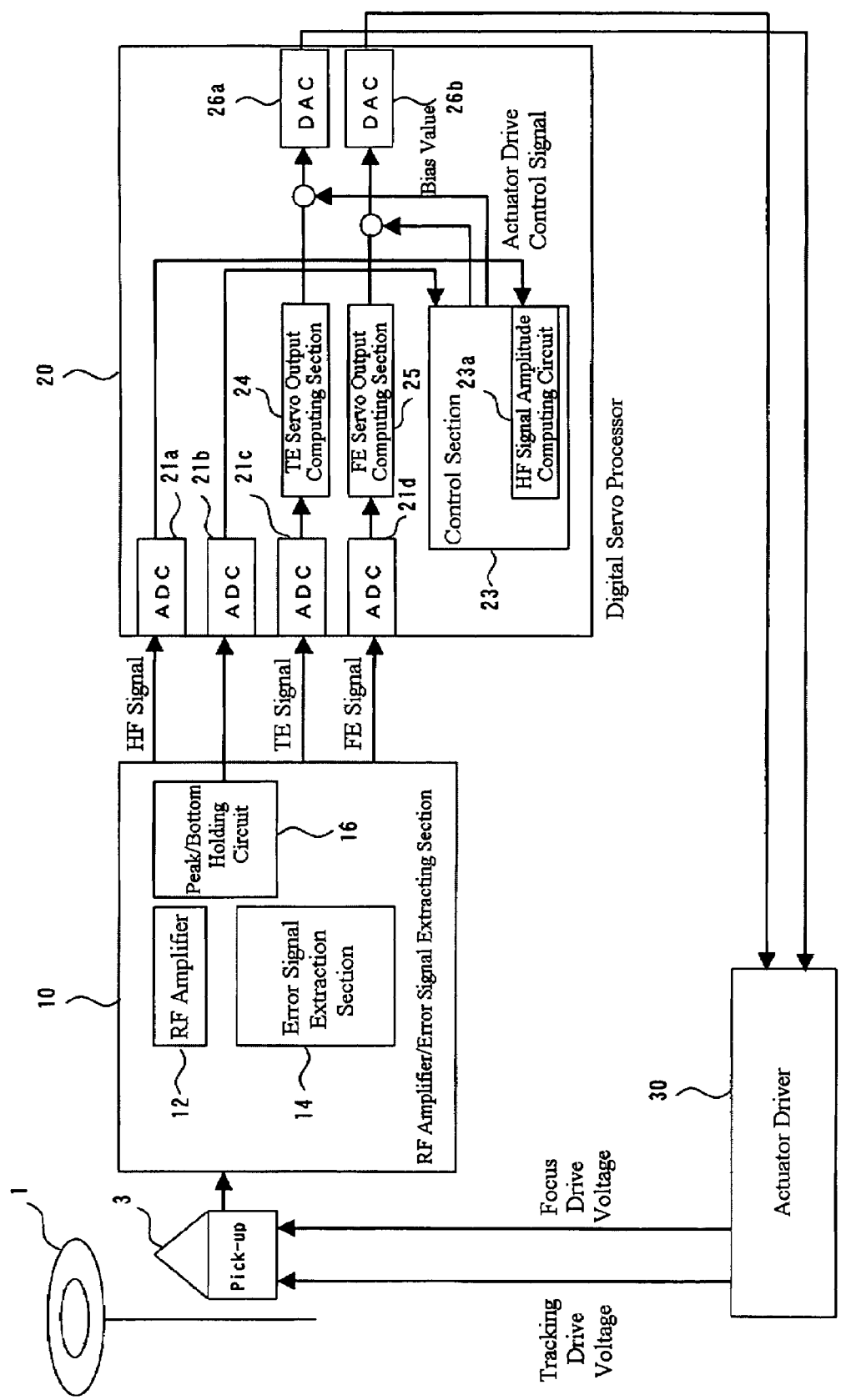
FIG. 1 is a block diagram which shows configuration of a main part of an optical disc drive for implementing the focus bias adjusting method according to the present invention.

Hereinbelow, a preferred embodiment of the disc drive of the present invention will now be described in detail with reference to the appended drawing.

In this regard, it is to be noted that the following description will be made with regard to the case that the focus bias adjustment method of the present invention is applied to an optical disc drive of the type that can reproduce an optical disc such as CD-ROM. However, it goes without saying that the focus bias adjustment method of the present invention can be applied to other types of optical disc drives.

The feature of the present invention resides in an adjustment method which can determine an optimum focus bias without engaging or operating tracking servo in an optical disc drive. Specifically, in the present invention, instead of engaging tracking servo, an actuator of an optical pick-up is driven so that a laser beam projected from the optical pick-up (that is, an objective lens) is moved or displaced oscillatingly in a tracking direction (in a radial direction of an optical disc), whereby intentionally creating a pseudo state resembling a state in which tracking servo is being actually engaged. Then, by using an HF signal obtained under such condition, a focus bias for focus servo at which the amplitude of the HF signal becomes maximum is determined, and the focus bias value at that point is set as an optimum bias value to perform the focus bias adjustment.

FIG. 1 is a block diagram which shows configuration of a main part of an optical disc drive for implementing the focus bias adjustment method according to the present invention. In this drawing, the reference numerals 1, 3, 10, 20 and 30 respectively denote an optical disc, an optical pick-up, an RF amplifier/error signal extracting section, a digital servo processor, and an actuator driver. The actuator driver 30 supplies a tracking drive voltage and a focus drive voltage to the optical pick-up 3, whereby a tracking actuator (tracking coil) and a focusing actuator (focusing coil) provided in the optical pick-up 3 (not shown in the drawing) are actuated so that an objective lens (not shown) of the optical pick-up 3 is moved in a tracking direction (in a radial direction of an optical disc) as well as in a focus direction (in a direction vertical to the recording surface of the optical disc) to carry out tracking servo and focus servo.

In more details, a laser beam projected from the optical pick-up 3 is reflected on the recording surface of the optical disc 1, and then the reflected laser beam is received by a photodetector provided in the optical pick-up 3 (not shown in the drawing). An RF signal from the photodetector is sent to an RF amplifier/error signal extracting section 10. The RF amplifier/error signal extracting section 10 includes an RF amplifier 12 which amplifies an RF signal to generate an HF signal, and an error signal extracting circuit 14 which generates a tracking error signal (TE signal) and a focus error signal (FE signal) based on the RF signal, and a peak/bottom holding circuit 16 which extracts an envelope of the HF signal.

The HF signal, the envelope signal, the tracking error signal and the focus error signal are respectively inputted into the digital servo processor 20 through A/D converters 21a, 21b, 21c and 21d. In more details, the HF signal and the envelope signal are respectively inputted into a control section 23 through the A/D converters 21a and 21b. The tracking error signal is inputted into a tracking servo output computing circuit 24 through the A/D converter 21c. Further, the focus error signal is inputted into a focus servo output computing circuit 25 through the A/D converter 21d. The tracking servo signal and the focus servo signal from the tracking servo output computing circuit 24 and the focus servo output computing circuit 25 are outputted to the actuator driver 30 through the D/A converters 26a, 26b, respectively.

The control section 23 is configured so as to supply an actuator drive control signal instead of the tracking error signal. Namely, when the focus bias adjustment of the present invention is implemented, the control section 23 is operated to turn off the tracking servo, and instead thereof supply the actuator drive control signal to the actuator driver 30.

The actuator drive control signal is a signal for actuating an actuator of the optical pick-up so that a laser beam projected from the optical pick-up 3, that is an objective lens of the optical pick-up 3, is moved or displaced oscillatingly in a tracking direction (in a radial direction of an optical disc) under the condition that the tracking servo is not engaged. When the actuator drive control signal is outputted, a drive signal in the form of a pulse wave or a sinusoidal wave is applied to the tracking actuator of the optical pick-up 3. In more details, a pulse wave of about 100 Hz is outputted from a port of a microcomputer, and it is then inputted into the actuator driver 30 through a capacitor and a register connected in series. In this way, it is possible to intentionally create a pseudo state resembling a state in which tracking servo is being actually engaged in spite that the tracking servo is not being engaged.

Further, the control section 23 also outputs a focus bias signal (focus bias value) for adjusting a focus bias together with the focus servo signal, thereby enabling to adjust the focus bias value. In this connection, it is to be noted that the control section 23 is also provided with an HF signal amplitude computing circuit 23a for determining this focus bias value.

The actuator driver 30 supplies a tracking drive voltage and a focus drive voltage to the tracking actual or and the focusing actuator, respectively, in response to the tracking servo signal and the focus servo signal outputted from the digital servo processor 20. Further, in the case where the actuator drive control signal is inputted instead of the tracking servo signal, the actuator driver 30 supplies a drive signal in the form of a pulse wave or a sinusoidal wave so as to actuate or drive the tracking actuator of the optical pick-up 3 so that the objective lens of the optical pick-up 3 is moved or displaced oscillatingly in a tracking direction.

Hereinbelow, a description will be made with regard to the operation in the case where the focus bias adjustment is carried out using the circuit shown in FIG. 1.

As described above, when the focus bias adjustment according to the present invention is carried out, the actuator of the optical pick-up 3 is actuated so that the laser beam projected from the optical pick-up 3 is moved or displaced oscillatingly in the tracking direction without engaging the tracking servo. In other words, the actuator is driven so that the objective lens is moved or displaced oscillatingly in the tracking direction. Namely, the actuator drive control signal is supplied from the control section 23 instead of the tracking servo signal, and the actuator drive control signal is outputted into the actuator driver 30 through the D/A converter 26a. Then, the actuator driver 30 applies a drive voltage in the form of a pulse wave or a sinusoidal wave into the tracking actuator of the optical pick-up 3 in response to the actuator drive control signal. In this connection, it is to be noted that during this operation, the actuator driver continuously supplies the focus drive voltage to the optical pick-up 3.

In this state, when the optical disc 1 is rotated by a spindle motor not shown in the drawing, the tracking actuator is actuated by the drive signal in the form of a pulse wave or a sinusoidal wave to move the objective lens oscillatingly in the tracking direction, that is to displace the objective lens oscillatingly so that the laser beam traverses many tracks in a reciprocal manner, thereby outputting an HF signal.

Since the laser beam traverses many tracks, the obtained HF signal becomes a signal having irregular amplitudes which appear at only on-track positions. Then, this HF signal is made to pass through the peak/bottom holding circuit 16 in the RF amplifier/error signal extracting section 10 to detect the amplitudes thereof. Specifically, after a DC component in the HF signal has been eliminated by a high-pass filter, such a signal is made to pass through the peak/bottom holding circuit 16 to extract an envelope thereof. In this case, since the objective lens is moved oscillatingly as described above, the obtained HF signal apparently looks like a signal obtained only from on-track positions, thus enabling to extract a pseudo HF signal resembling to an HF signal obtained when tracking servo is actually engaged.

When a focus bias is added to the HF signal that has passed through the peak/bottom holding circuit 16 to vary the bias value, the amplitude of the HF signal is increased and decreased. Therefore, a bias voltage at which the largest amplitude is obtained is set as a focus bias value by which an optimum focusing point of the laser beam can be obtained. Namely, the HF amplitude circuit 23a of the control section 23 determines such a bias voltage value by which the largest amplitude is obtained to apply such a voltage to the focus servo signal as the focus bias.

As described above, according to the focus bias adjustment method of the present invention, an optimum focus bias value can be obtained without engaging tracking servo, thereby enabling to make the focusing point adjustment. Therefore, as compared with the conventional method in which the focus bias adjustment is carried out in a state that tracking servo is engaged, it is possible to carry out focus bias adjustment in a stable state, that is in a state that a trouble such as dislocation of tracking servo will not occur.

In the present invention, it is to be noted that a circuit for implementing the focus bias adjustment method of the present invention is not limited to the circuit shown in the drawing, circuits having various configurations may be employed. For example, the actuator drive control signal and the focus bias signal may be supplied from a CPU which controls the whole of the optical disc drive not from the servo processor in the embodiment described above.

Further, although the focus bias adjustment method of the present invention is mainly used when optical disc drives are manufactured and shipped, the method may be used each time upon an optical disc is loaded into an optical disc drive when the optical disc drive is actually used.

Further, in the case of optical disc drives that can record and reproduce data to and from two or more types of optical discs, it is possible to set different optimum focus bias values obtained by the present invention so as to be suited for each type of optical disc in advance, so that a focus control is carried out based on the appropriate focus bias value in accordance with a type of optical disc to be loaded into the optical disc drive.

Furthermore, although the above embodiment was described with reference to the case where the focus bias adjustment method according to the present invention is applied to the optical disc drive that can reproduce CD-ROM, the present invention may be applied to other optical disc drives for other mediums such as CD-R, CD-RW, DVD, DVD-RAM, DVD-RW, MD and the like. In this regard, however, it is to be noted that it is necessary for these mediums that they are not blank discs, since the present invention requires to obtain an HF signal from the optical disc.

As described above, according to the focus bias adjustment method of the present invention, it is possible to made a focusing point adjustment by determining an optimum focus bias without engaging tracking servo. Therefore, as compared with the conventional method in which adjustment is carried out in a state that tracking servo is being engaged, it is possible to carry out the focus bias adjustment in a stable state (that is, in a state that a trouble such as dislocation of tracking servo will not occur).

Finally, it is needless to mention that the present invention is not limited to the above-described embodiments but can be modified or improved in various ways within the scope described in the following claims.

What is claimed is:

1. A method for adjusting a focus bias in an optical disc drive, comprising the steps of:
    rotationally driving an optical disc in a state that only a focus servo is engaged without engaging a tracking servo;
    driving an actuator of an optical pick-up so that a laser beam projected from the optical pick-up is moved oscillatingly in a tracking direction, thereby intentionally creating a pseudo state resembling a state in which the tracking servo seems to be actually engaged so as to obtain a first HF signal in such a state from data on-track positions of the optical disc in the tracking direction;
    passing the thus obtained first HF signal into a peak/bottom holding circuit to obtain a second HF signal which apparently looks like a signal obtained only from data of all the on-track positions of the optical disc;
    adding a focus bias to the thus obtained second HF signal so that the amplitude of the second HF signal is increased or decreased; and
    determining an optimum focus bias at which the largest amplitude of the second HF signal is obtained.

2. The method for adjusting a focus bias in an optical disc drive as claimed in claim 1, wherein the driving of the actuator is carried out by supplying an actuator drive control signal to a tracking actuator of the optical pick-up in a state that tracking servo is not engaged.

3. The method for adjusting a focus bias in an optical disc drive as claimed in claim 1, wherein the actuator drive control signal includes a signal which applies a drive voltage in the form of a pulse wave or a sinusoidal wave to the tracking actuator.

4. The method for adjusting a focus bias in an optical disc drive as claimed in claim 1, wherein the adjustment of the focus bias is carried out every time upon an optical disc is loaded into the optical disc drive.

5. An optical disc drive equipped with circuits to perform each of the method steps of any one of claims 1, 2, 3, or 4.

6. A method for adjusting a focus bias in an optical disc drive, comprising the steps of:
    rotationally driving an optical disc in a state that only a focus servo is engaged without engaging a tracking servo;
    driving an actuator of an optical pick-up so that a laser beam projected from the optical pick-up is moved oscillatingly in a tracking direction, whereby intentionally creating a pseudo state resembling a state in which the tracking servo seems to be actually engaged, to thereby obtain a first HF signal in such a state from data on-track positions of the optical disc in the tracking direction;
    passing the thus obtained first HF signal into a peak/bottom holding circuit to obtain a second HF signal which apparently looks like a signal obtained only from data of all the on-track positions of the optical disc;
    adding a focus bias to the thus obtained second HF signal so that the amplitude of the second HF signal is increased or decreased; and
    determining an optimum focus bias at which the largest amplitude of the second HF signal is obtained;
    wherein the driving of the actuator is carried out by supplying an actuator drive control signal to a tracking actuator of the optical pick-up in a state that tracking servo is not engaged, and wherein the actuator drive control signal includes a signal which applies a drive voltage in the form of a pulse wave or a sinusoidal wave to the tracking actuator.

7. The method for adjusting a focus bias in an optical disc drive as claimed in claim 1, wherein determining an optimum focus bias at which the largest amplitude of the second HF signal is obtained is carried out within a range of the focus bias based on which a focus servo can be engaged.

8. The method for adjusting a focus bias in an optical disc drive as claimed in claim 1, wherein determining an optimum focus bias at which the largest amplitude of the second HF signal is obtained is carried out without comparison with a reference value.

* * * * *